Patented July 9, 1935

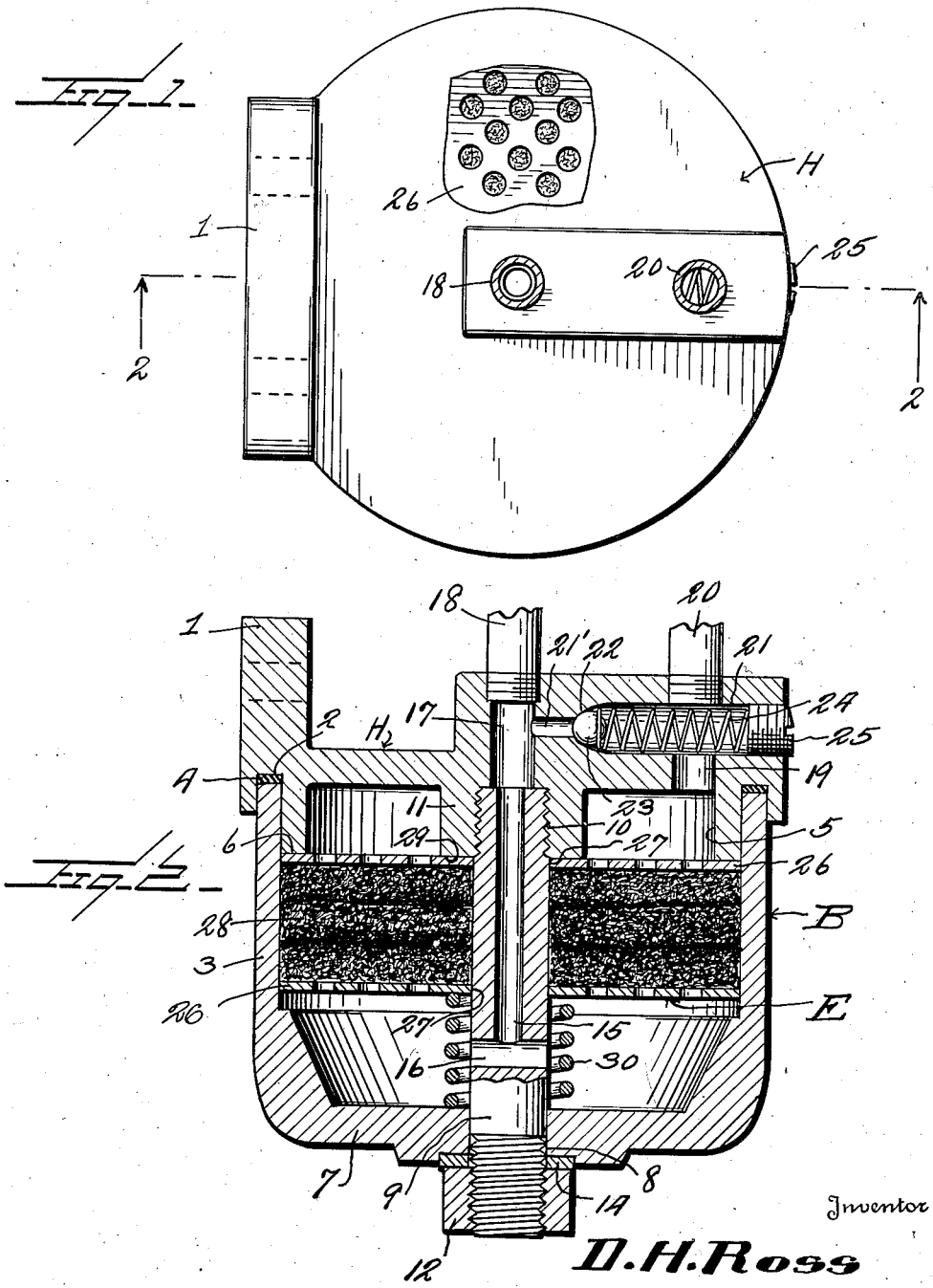

2,007,615

UNITED STATES PATENT OFFICE 2,007,615

OIL FILTER

David H. Ross, Long Beach, Calif.

Application August 7, 1934, Serial No. 738,888

2 Claims. (Cl. 210—134)

This invention relates to an oil filter and particularly of a type for use in connection with internal combustion engines, and it is primarily an object of the invention to provide a device of this kind comprising an assembly of parts to assure an effective separation of grit, muck and the like from the oil and more particularly after it leaves the crank case.

Another object of the invention is to provide a device of this kind wherein is provided means to permit the continued flow of oil in the event the filtering element should become unduly clogged and thereby reduce to a minimum the liability of the bearings of the engine running dry.

The invention consists in the details of construction and in the combination and arrangement of the several parts of my improved oil filter whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein:—

Figure 1 is a view in top plan with a portion broken away of an oil filter constructed in accordance with an embodiment of my invention;

Figure 2 is a sectional view taken substantially on the line 2—2 of Figure 1 with certain of the parts in elevation.

As disclosed in the accompanying drawing, H denotes a head of desired dimensions and configuration adapted to be mounted upon a bowl B to close the upper open face thereof. The head H at a marginal portion thereof is provided with an upstanding plate 1 affording means whereby the device in its entirety may be anchored in desired position upon a suitably provided support.

The under surface of the head H adjacent to its marginal portion is provided with a continuous groove or channel 2 in which is received the upper free marginal portion of the side wall 3 of the bowl B, and interposed between the base of the groove 2 and the opposed edge of the wall 3 is a suitable gasket 4 whereby a tight connection is assured. The head H is also provided with a continuous flange 5 depending therefrom, the outer face of which constitutes a continuation of the inner side wall of the channel 2 and this flange 5 is tightly and telescopically received within the upper or open end portion of the bowl B. This flange 5 is of desired length and the free edge thereof provides a stop 6 for a purpose to be hereinafter referred to.

At substantially the axial center of the bowl B the bottom wall 7 of such bowl is provided with an opening 8 through which is directed an elongated shank 9. The upper or inserted end portion of this shank or member 9 is threaded or otherwise engaged, as at 10, within a boss 11 depending from the central portion of the head H. This member or shank 9 is of a length to extend beyond the lower wall 7 of the bowl B so that a clamping member 12, such as a nut, may be threaded upon said lower extended portion of the member or shank 9 to effectively maintain the head H and bowl B in required assembly. Interposed between the applied clamping member or nut 12 and the opposed face portion of the bottom wall 7 of the bowl B is a gasket 14 surrounding the member or shank 9 and serving to prevent leakage out through the opening 8.

The inserted portion of the member or shank 9 through the major portion thereof is provided with a passageway or bore 15 open at the upper or inserted end of the member or shank and with the lower end of said passageway or bore in communication with a transversely disposed passageway or opening 16 directed entirely through the member or shank 9 at a point closely adjacent to the bottom wall 7 of the bowl B. The passageway or bore 15 at its upper end communicates with an inlet opening 17 in communication through the medium of the pipe line 18 with a crank case of an internal combustion engine so that when said engine is in operation the oil in such crank case may have desired circulation through the filter.

The return of the oil to the crank case is through an eduction opening 19 disposed through the head H to one side thereof and which opening 19 has in communication therewith the carry-off line 20. The opening 19 is intersected by a radially disposed bypass 21 provided in the head H and opening through the peripheral face thereof. This bypass 21 is in communication with the induction opening 17 and the portion 21' of the bypass 21 immediately adjacent to the opening or bore 17 is reduced in diameter to provide a seat 22 for a valve member 23 herein disclosed as spherical. This valve member 23 is normally seated to close the flow from the opening or bore 17 through the bypass 21 to the carry-off pipe 20 and this normal position of the valve member 23 is maintained by the expansible spring 24 of requisite tension and preferably of a spiral type.

This spring 24 is positioned within the bypass 21 and interposed between and contacting with the valve member 23 and an applied plug 25 for closing the outer end of the bypass 21. This plug 25 as herein disclosed is threaded in position and thus provides means whereby the tension of the spring 24 can be readily and conveniently regulated and also allows for a ready application or removal of the spring 24 as well as the valve member 23.

The interior of the bowl B is intersected by a screening element E which, as is particularly illustrated in Figure 2, comprises two perforated plates 26 snugly fitting within the bowl B and having their central portions provided with the openings 24 whereby the plates 26 may be mounted upon the member or shank 9 free for movement therealong. Interposed between the plates 26 are the overlying pads 28 of suitable effective filtering material and which pads are snugly engaged within the chamber of the bowl B between the plates 26. The uppermost plate 26 has contact with the stop 6 hereinbefore referred to and also, as illustrated in Figure 2, with the central stop 29 as afforded by the inner edge face of the boss 11.

Surrounding the applied member or shank 9 and interposed between the bottom 7 of the bowl B and the lower plate 26 may be an expansible member 30 of desired tension which serves to hold the plates 26 and the pads 28 in desired effective position. It is also to be stated that the strength or tension of this spring 30 is determined according to the oil pressure maintained in the engine in connection with which the filter is employed.

Under normal conditions the oil from the crank case enters the lower portion of the chamber of the bowl B through the passageway or bore 15 and passageway or opening 16 and then up through the filtering element E and out through the carry-off pipe 20 which may lead back to the crank case of the engine.

Should the filtering element E become clogged up for any reason, the desired return of the oil to the engine, unfiltered however, will be out through the bypass 21 to the carry-off pipe 20 as the valve member 22 will open as a result of the increased pressure imposed thereon. It is to be stated, however, that with ordinary care in the replacement of dirty pads 28 no danger from the filter clogging should be experienced but the bypass 21 and its associated parts are provided in order to protect the engine against the careless, thoughtless and ignorant motorist.

From the foregoing description it is thought to be obvious that an oil filter constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. An oil filter comprising a bowl having one end open, the opposite end being closed, a head for closing said open end, a member carried by the head and extending through the closed end of the bowl, means engaged with said member and coacting with the closed end for holding the head in applied position upon the bowl, a filtering element intersecting the bowl and freely mounted upon the member, said head having a part extending within the bowl to provide a stop for limiting the movement of the filter in one direction on the member, an expansible member for constantly urging the filtering element at the limit of such movement, said bowl having an induction passageway delivering within the bowl to one side of the filtering element, an eduction opening in communication with the bowl at the opposite side of the filtering element, said filtering element comprising perforated plates, and a filtering pad interposed between the plates.

2. An oil filter comprising a bowl having one end open, the opposite end being closed, a head for closing said open end, a member carried by the head and extending through the closed end of the bowl, means engaged with said member and coacting with the closed end for holding the head in applied position upon the bowl, a filtering element intersecting the bowl and freely mounted upon the member, said head having a part extending within the bowl to provide a stop for limiting the movement of the filter in one direction on the member, an expansible member for constantly urging the filtering element at the limit of such movement, said bowl having an induction passageway delivering within the bowl to one side of the filtering element, and eduction opening in communication with the bowl at the opposite side of the filtering element, said filtering element comprising perforated plates, and a plurality of overlying filtering pads interposed between the plates.

DAVID H. ROSS.